US008272061B1

(12) United States Patent
Lotem et al.

(10) Patent No.: US 8,272,061 B1
(45) Date of Patent: *Sep. 18, 2012

(54) METHOD FOR EVALUATING A NETWORK

(75) Inventors: Amnon Lotem, Ramot Hashavim (IL);
Gideon Choen, Palo Alto, CA (US);
Moshe Meiseles, Hod-Hasharon (IL)

(73) Assignee: Skyobox security Inc., San Jose, CA (US)

( * ) Notice: Subject to any disclaimer, the term of this patent is extended or adjusted under 35 U.S.C. 154(b) by 1035 days.

This patent is subject to a terminal disclaimer.

(21) Appl. No.: 11/751,021

(22) Filed: May 20, 2007

Related U.S. Application Data

(63) Continuation-in-part of application No. 11/118,308, filed on Apr. 28, 2005, now Pat. No. 8,099,760, which is a continuation of application No. 10/262,648, filed on Oct. 1, 2002, now Pat. No. 6,952,779.

(60) Provisional application No. 60/869,833, filed on Dec. 13, 2006.

(51) Int. Cl.
*G06F 11/00* (2006.01)
(52) U.S. Cl. ............ 726/25; 726/22; 726/23; 726/24; 713/164; 713/165; 713/194; 709/223; 709/224; 709/225
(58) Field of Classification Search .......... 713/164–165, 713/194
See application file for complete search history.

(56) References Cited

U.S. PATENT DOCUMENTS

| | | | |
|---|---|---|---|
| 6,324,656 B1* | 11/2001 | Gleichauf et al. | 714/37 |
| 6,546,493 B1* | 4/2003 | Magdych et al. | 726/25 |
| 6,952,779 B1* | 10/2005 | Cohen et al. | 726/22 |
| 6,968,377 B1* | 11/2005 | Gleichauf et al. | 709/224 |
| 7,016,499 B2* | 3/2006 | Perlman | 380/281 |
| 7,058,821 B1* | 6/2006 | Parekh et al. | 713/194 |
| 7,359,962 B2* | 4/2008 | Willebeek-LeMair et al. | 709/223 |
| 2004/0111632 A1* | 6/2004 | Halperin | 713/200 |
| 2004/0128543 A1* | 7/2004 | Blake et al. | 713/201 |
| 2005/0193430 A1* | 9/2005 | Cohen et al. | 726/25 |
| 2007/0220606 A1* | 9/2007 | Omote et al. | 726/24 |

OTHER PUBLICATIONS

Swiler, Laura Painton, et al.; "A Graph-Based Network-Vulnerability Analysis System", Sandia Report, Jan. 1998, pp. 1-21.*

* cited by examiner

*Primary Examiner* — Taghi Arani
*Assistant Examiner* — Amir Mehrmanesh
(74) *Attorney, Agent, or Firm* — Reches Patents

(57) ABSTRACT

A method for evaluating access rules violations, the method includes: receiving, a model of a computer network; and determining security metrics associated with a violation of an access rule in response to: the model of the computer network, multiple network nodes of the computer network accessible according to at least one violated access rule or according to the network model, at least one vulnerability associated with the multiple network nodes, and damage associated with an exploitation of the at least one vulnerability.

60 Claims, 9 Drawing Sheets

METHOD FOR EVALUATING A NETWORK

BACKGROUND OF THE INVENTION

This application is a continuation in part of U.S. patent application Ser. No. 11/118,308 filing date Apr. 28, 2005 now U.S. Pat. No. 8,099,760 which is a continuation of U.S. patent application Ser. No. 10/262,648 filing date Oct. 1, 2002, now U.S. Pat. No. 6,952,779, issued on Oct. 4, 2005. This application claims priority from U.S. provisional patent 60/869,833 filing date Dec. 13, 2006, all applications being incorporated by reference.

Computer networks enable communication between nodes in the network in order to support the operation of the systems, applications and services. Computer networks are plagued with vulnerabilities. Vulnerabilities are weaknesses in computers and devices caused for example, by bugs or miss-configurations. Possible access between nodes can be exploited by unauthorized entities. Attackers can attack computer networks by exploiting possible access and vulnerabilities, frequently causing damages such as denial of service and theft of corporate secrets. Attackers often exploit several vulnerabilities in a row starting with one device, attacking several devices along the way, and ending the final target device. Attackers may start attacks from the Internet, an intranet, or any other network. Consequently, access control mechanisms are incorporated in computer networks in order to constraint the possible access to the access required for the proper operation of the network. Access control mechanisms include firewalls, routers with ACL (access list) rules, intrusion prevention systems (IPS) and more. The access control mechanism can be viewed as the tools to enforce network access policy. Network access policy specifies constraints on the permitted access in the network. An example of a policy access rule can be that access from the Internet to http services of specified hosts is permitted, while access to NetBios ports from the Internet should be denied. Various formal methods were suggested for defining and representing network access policies. For example publication of Y. Bartal, A. Mayer, K. Nissim, and A. Wool Firmato: a novell firewall management toolkit. IEEE Symposium and Privacy, pages 17-31, 1999. A formal specification of the network access policy enables to check using automatic tools the compliance of the network with the access policy. Various publications relate to methods for performing the compliance check.

In large networks, the access might relate to a huge number of access situations, and the number of violations of the access policy might be big. Furthermore, the rules of the access policy itself might allow access that enables attacks with high potential risk Consequently there is a need to help security staff to understand the security risk and the business impact of any given policy rule or any policy rule violation, and to enable accurate prioritization of handling the rules and the violations. These required abilities can have dramatic effect on the efficiency, accuracy and timelines of security assessments. Current methods do not enable the prioritization of violations, and risky access.

Thus, there is a need to provide methods of evaluating the risk level of policy violations and risky access and associate security metrics. These methods should be of use in handling violations of policy access rules and enhancing the coverage of the policy including, for example, finding the main risks by identifying possible attack scenarios by various threats, determining their business impacts and prioritizing the violation of policy access rule or the access rule itself according to their contribution to the main risks or other factors and reporting them.

SUMMARY

A method for evaluating an access from a first network node to a second network node, the method includes: receiving information representative of the first network node and of the second network node; the first network node is capable of accessing the second network node associated with a violation of a first policy access rule, or associated with a second policy access rule; determining security metrics associated with an access from the first network node to the second network node in response to: attack characteristics of a first group of start network nodes that can attack the first network node and attack characteristics of a second group of target network nodes that can be attacked from the second network node.

A method for evaluating an access capability, the method includes: receiving or generating information representative of the access capability; the access capability is associated with a source network node and a destination network node; determining security metrics associated with the access capability in response to: attack characteristics of a group of network nodes that are capable of attacking the source network node associated with the access capability, attack characteristics of a group of network nodes that are capable of being attacked from the destination network node associated with the access capability, and attack characteristics of the source and the destination nodes associated with the access capability.

A computer readable medium having computer-readable code embodied therein for evaluating an access from a first network node to a second network node, the computer-readable code includes instructions for: receiving information representative of the first network node and of the second network node; wherein the first network node is capable of accessing the second network node associated with a violation of a first policy access rule, or associated with a second policy access rule; determining security metrics associated with an access from the first network node to the second network node in response to: attack characteristics of a first group of start network nodes that can attack the first network node and attack characteristics of a second group of target network nodes that can be attacked from the second network node.

A computer readable medium having computer-readable code embodied therein for evaluating an access from a first network node to a second network node, the computer-readable code includes instructions for: receiving or generating information representative of the access capability; wherein the access capability is associated with a source network node and a destination network node; determining security metrics associated with the access capability in response to: attack characteristics of a group of network nodes that are capable of attacking the source network node associated with the access capability, attack characteristics of a group of network nodes that are capable of being attacked from the destination network node associated with the access capability, and attack characteristics of the source and the destination nodes associated with the access capability.

BRIEF DESCRIPTION OF THE DRAWINGS

The invention is illustrated in the figures of the accompanying drawings which are meant to be exemplary and not limiting, in which like references are intended to refer to like or corresponding parts and in which.

DESCRIPTION OF THE PREFERRED EMBODIMENTS

Preferred embodiments of methods and computer programs according to this invention are described through reference to the figures.

The following are examples and illustrations relating to the terms used herein, and are not intended to be limiting of the scope of such terms. The term "network", as used herein, whether itself or in association with other terms, generally includes or refers to not only a network as a whole, but also any components or aspects thereof, such as network nodes, groups of network nodes, or components or aspects of network nodes, as well as services, applications, hardware, hardware components, software, software components, and the like, associated with the network or any component or aspect thereof, as well as any associated configurations. The term, "network service," and similar terms, as used herein, generally includes any software, software components, applications, operating systems, and the like, associated with the network, its nodes, or any other component or aspect of the network, as well as associated configurations, including service configurations, and including services that can be activated from or in association with network nodes. The term, "network model," and similar terms, as used herein, generally includes a variety of types of information relating to the network or any components or aspects thereof, such as network nodes, and includes configurations of or associated with network devices (firewalls, routers, load balancer, IPS, worm protecting systems, etc.) computers, software, software components, applications, operating systems, and the like, including network services information and network topology information.

Figure 1:
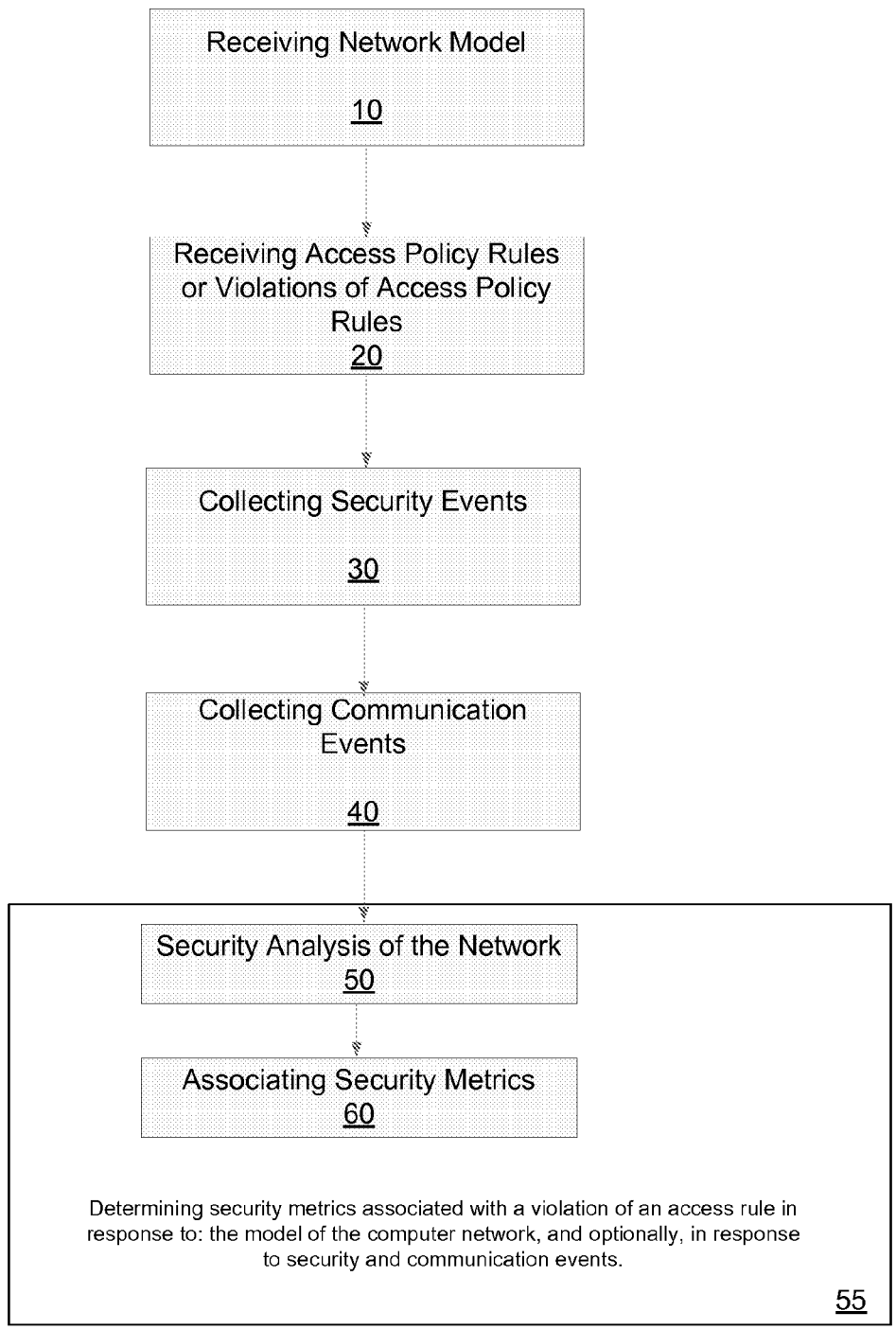
FIG. 1 is a flow diagram showing a method of associating security metric to a violated policy access rule in a computer network in accordance with one embodiment of the present invention.

FIG. 1 describes a method of associating security metrics to a violated policy access rule in a computer network in accordance with one embodiment of the present invention. The method described herein applies also for associating security metrics to policy access rules.

First receiving or building the network model represented by software data structures, step 10. These data structures represent nodes; network interfaces of nodes, networks, and services installed on nodes. The network model represents a required scope of a computer network. It models the topology of the network, the nodes and services in the network, and the configurations of the network devices (firewalls, routers, load balancer, IPS, worm protecting systems, etc.). The model can also represent, in somewhat abstract way: (1) networks which are out of the scope of the model but are connected to entities in the model (e.g., the Internet, or networks of partners), and (2) groups of networks that the knowledge on their nodes and topology is limited (for example, only the range of IP addresses is known). We will use the term "cloud" for such abstract entities.

Software data structures are used for representing the entities in a computerized media. These data structures represent nodes, network interfaces of nodes, networks, and services (applications) installed on nodes (including the OS), etc. The above model can be extended to include layer 2 network elements: layer 2 ports of devices, VLANs, layer 2 segments, etc. The network model can be held in a computer server. The network model can be retrieved from an external source or can be built from data sources such as configuration file of network devices, and output of scanner files. Such a model building process can be done as follows: Collecting and importing configurations of gateways and protection systems by utilizing collection agents that communicate with the gateways (router, firewalls, load balancers, etc.) or the protection systems (IPS, worm protecting systems, etc.) to get their configurations. Alternatively the agents communicate with a repository or management system which already holds the configurations, and get the configurations from them.

The configurations are transferred to the server. Alternately, a computer program inserts the gateway data into the model it parses each of the configurations, extracts the information which is relevant for the model (name, primary, IP address network interfaces, routing tables, access lists, protection definitions, etc.) and inserts the information into the model. The program then builds the topology of the model by creating networks and including in them the relevant network interfaces. This is done based on the IP addresses of the network interfaces, and other data gathered from the gateways by collecting data on the network nodes. The collecting agents invoke or query various data source in order to get nodes data. The data sources might include network scanners, vulnerability scanners, patch management systems, and product inventories.

The information which is gathered on the nodes might include: OS, services (applications) installed on each node and their details, configuration parameters, etc. Consequently, the information supplied by the data sources is transferred to the server. A computer program analyzes the collected data, inserts new nodes into the model (desktops, servers), and associates service and vulnerability entities with existing nodes in the model. The collection process can be repeated on a regular basis to refresh the model with up-to-date data: adding new discovered entities, removing entities which are not exists anymore, and updating the data items of existing entities.

In a system which implements the method, the network model can be edited by the user using a graphic user interface. Editing might include adding new devices, deleting devices, or changing the configuration of devices in the model. On top of the network model a security model is built. The security model can include but not limited to, information on network vulnerabilities, security information on services, threats and their potential source in the network, business assets. In some cases not all of the information types are included in the security model for example; the model may lack vulnerability information or threat information.

Step 20 includes the receipt or specification of network access policy and determining violations of policy access rules. A network access policy specifies constraints and requirements for access within the network. A network access policy consists of a set of policy rules. The rules typically relate to a source network node, destination network node, and the required relation between them. The source network node and the destination network node might be expressed in network terms (IP addresses, ports) or in abstract terms of users, roles, zones, zone types, etc, which might be more compact to write, and more stable as the implementation of the network changes (as described for example in [1]). A policy access rule which is defined in abstract terms can specify for example that no access should be possible from "External" networks to NetBIOS ports of "DMZ"'s (demilitarized zones). When the source network node or the destination network node are expressed in an abstract way (e.g., External, DMZ), we assume that the mapping between the abstract terms and concrete network terms exists, and a rule which relates to the abstract terms can be translated into one or more rules that their source and destination are concrete network elements. For example, the above rule (from External to DMZ) might be translated, in the context of a particular organizational network, into a rule that states: No access from the Internet or from Partner1 to NetBIOS ports of dmz1, dmz2, or dmz3 (concrete networks).

The source of a (concrete) rule represents a set of network nodes. The destination of a rule represents a set of other network nodes and specified services or ports of these nodes (e.g., source: Internet; destination: netBIOS ports of dmz1). Several relation types can be defined between the source and destination of a rule, such as "Full access" rules, "No access" rules, and "Limited access" rules.

Full access rules. These rules define that the services specified in the destination should be accessible from any source node. This relation is typically used for expressing operational requirements. For example, the web services of the home banking web servers should be accessible from the Internet (full access between the node that represents the Internet and a group of nodes that represents the home banking web servers and their web services).

No access rules. These rules define that none of the services (or nodes) in the destination should be accessible from a source node. This relation is typically used for expressing security requirements and best practices. For example, no access should be possible from the Internet to NetBIOS ports of the DMZ (135/TCP, 135/UDP, 137/TCP, 137/UDP, . . . ).

Limited access rules. These rules define that the amount of access between the source and the destination should be limited. The limitation can be quantitative, stating that the number of source IP addresses which can access the destination, the number of destination IP addresses which are accessible form the source, or the number of source IP-destination IP combinations with access between them should be smaller than a specified amount. The limitation can also be qualitative, requiring that some limitation will be imposed on access between the source and the destination (i.e. not a full access from the source to the destination). The limited access relation is typically used for assuring that the access between the source and the destination is controlled by the filtering devices in the network, without specifying in the policy the exact required control. For example, the access from the Internet to DNS ports in the DMZ is limited to 5 accessible ports (based on the knowledge that the organization supports no more than 5 public DNS servers).

The relation defined between the source and the destination of a rule might be associated with attributes. For example a requirement for a secure (encrypted) connection or authenticated connection between the source and the destination.

A policy rule can be associated with a rank that expresses the importance of the policy rule. This rank can be used as an initial measure for the criticality of policy violations.

Note that the specification of a network access policy could be partial, expressing only a partial set of access constraints on a network.

A compliance check of the network with the network policy is performed. During this process violated rules are identified and a violations repository is created. This process uses a network model for determining if the access in the network is compliant with the policy. It checks which of the policy rules are kept and which of the rules are violated. When a policy access rule is found to be violated, a violation entity can be generated in order to record and report the violation. The violation entity holds information such as a reference to the violated rule, and the possible access that does not comply with the rule. For example, a policy rule that requires that there will be no access from the Internet to NetBIOS ports within the DMZ might be found as violated. The violation record specifies that an access is possible from the Internet to ports 137/TCP and 135/TCP of host h1 in the DMZ network.

One possible technique for checking the compliance is to examine the compliance of each the policy rules separately. A rule that requires for example, a full-access from X to Y, is checked by analyzing within the model the possible access from X to Y, taking in account the topology of the network, and the behavior of the devices: ACL rules, NAT rules, routing rules, etc. The access which is required by the policy is then compared with the access found as possible, verifying that any IP address in X can access any IP address and port specified in Y. A rule that prohibits access from X to Y (no-access) is checked by analyzing within the model the possible access from X to Y, and verifying that no such access exists. Other computation techniques are possible, such as simultaneously checking the compliance of several rules.

The invention which is described herein assumes that the techniques for compliance check exist and can be used for finding policy violations. An additional input that may be used (optional) for the association of security metric to a violation of an access rule is the security events collection, step 30. Malicious communication can be identified by various systems in the network. For example, it can be detected by intrusion prevention and detection systems (IPS, IDS), worm protection systems, and security information management (SIM) systems which perform event correlation between suspected events. The security events from these sources are gathered and stored in a repository. The repository can hold the data in a canonic way, using a common structure for the security events. The common structure might include: event type, reporting system, packet source, packet destination, original source, final destination, date and time, severity, and identification confidence. Repeating events can be aggregated and be stored once with instance count and time range.

The packet source and packet destination, are those which encountered by the detection system. When NAT (network address translation) and PAT (port address translation) rules are used by devices in the network for translating addresses and ports of transferred packets, the destination IP address which was captured by the detection system might be different than the final destination IP address. Similarly, the captured source IP address might be different than the original source IP address. This might cause a problem in matching between policy rules which relate to node IP addresses (i.e. the original and final addresses). To enable the matching, the original source and the final destination addresses of packets are identified and associated with the event. The identification can be done by using the network model. For example by finding the upstream path of the packet from the detection system, in order to identify the original source IP address, and analyzing the downstream path of the packet from the detection system toward the destination, in order to identify the final destination IP address. This analysis can also find out that the packet is actually blocked somewhere down the path, not arriving at the destination. Optimization of that process can be done, for example, by extracting translation rules for source IP addresses and destination IP addresses, which can be applied to the security events that arrive.

Step 40 describes the collection of communication data in the computer network. These events may also be used for determining the security metrics however, they are not mandatory. Information on communication in the computer network can be gathered for example by sniffers installed in the computer network, by network devices (in logs for example), and by IDS systems (configured to track after some kinds of non-malicious communication). The communication information from these sources can be gathered and stored in a repository. The repository can hold the data in a canonic way, using a common structure for the communication events. The common structure might include the reporting system, packet source, packet destination, original source, final destination, date and time. Repeating events can be aggregated and be stored once with instance count and time range. Original source and final destination IP addresses can be found according to the method described for security events.

Step 55 includes determining security metrics associated with a violation of an access rule in response to: the model of the computer network, and optionally, in response to security and communication events. The step include step 50 and step 60. Step 50 includes security analysis of the network, it determines which attacks or attack steps are possible in the network, and what are the risks imposed by these attacks. The process might utilize single step attack graphs and multi step attack graphs. The output of the analysis is used in later stages for associating security metrics with violations of policy rules. The security analysis typically records information on possible attack steps in the computer network that and their associated risk levels. A more detailed description of step 50 is presented in the section which explains FIG. 2.

Step 60, depicts the process of utilizing all inputs gathered in previous steps and associating security metrics for the policy rules violation. This process builds the metrics for policy rules violations. An initial metric that can be associated with policy violations is the importance value assigned to the violated policy rule (in case such a value is part of the policy specification). This metric however, does not capture the actual risks and consequences of an access in the network, as can be learnt from the security analysis, and the security events. Therefore, this process can build additional metrics for violations of policy rules based on the following information sources: results of the security analysis and repository of the security events. The metrics which are computed depend on the type of the policy rules, the type of the violations, and the availability of data for computing the metrics. A set of possible informative metrics for violations of policy rules is presented in the next sub-sections.

Violation of no-access rules, a violation of a no-access rule means that some nodes within the source can access some nodes and their services within the destination. This access capability is denoted as the violating access. The severity of such violations might differ according the potential of exploiting the access for attacking the network and causing damage. The metrics can be based on different sources and different analysis types: Metrics which are based on analysis of one step attacks from source network node to destination network node:

RISK_FROM_SOURCE—a value or scale that represents the risk which can be caused by one step attacks from the source network node to the destination network node. This metric takes in account assumptions regarding the likelihood that an attacker took control on source network node hosts, the likelihood for attacking the destination (based on vulnerability data, service data, or port data), and the expected damage (based on the importance of the destination hosts).

NUM_OF_VULS_ACCESSIBLE_FROM_SOURCE— the number of vulnerabilities of the destination network nodes which can be exploited from the source network node as a result of the possible access. The metric might consider only vulnerabilities that their severity is above some pre-defined threshold.

The information source for extracting the metrics is the results of the security the single-step attack analysis.

Metrics which are based on analysis of multi-step attacks:

CAN_BE_USED_FOR_ATTACKS—The access can be used for attacking the network from the potential attack starting points. The metric is set based on the results of the multi-step attack analysis. In particular, the metric is set to true if the attack graph includes attack graph nodes that represent access that matches the violating access. A match means that there is a non-empty intersection between the source-destination combinations represented by the access node, and the source-destination combinations represented by the violating access. More detailed indications can relate to the threats which can exploit the access such as CAN_BE_USED_FOR_WORM_ATTACK, CAN_BE_USED_BY_INTERNET_HACKER, etc.

ATTACKS_RISK—a value or scale that represents the risk that attacks which use the access could cause. This metric takes in account both the likelihood to perform attacks that use the access and the expected damage. The metric is set based on the results of the multi-step attack analysis. In particular, the metric aggregate the imposed risks of attack graph nodes—those nodes that represent access that matches the violating access. A match means that there is a non-empty intersection between the source-destination combinations represented by the access node, and the source-destination combinations represented by the violating access. An example of a possible aggregation method can be the Maximum or the Sum functions. More detailed indications can be also computed such as WORM_ATTACK_RISK, INTERNET_HACKER_ATTACK_RISK, etc.

NUM_OF_EXPLOITABLE_VULS—the number of vulnerabilities on the destination that can be exploited in (multi-step) attacks from the attacks sources, using the examined access. The metric is set based on the results of the multi-step attack analysis. In particular, the metric count the vulnerabilities which their exploitation in the attack graph depends on access nodes which matches the violating access.

Metrics which are based on security events:
NUMBER_OF_ATTACK_ATTEMPS—the number of attack attempts along some agreed period of time. More detailed indications can relate to the severity and the type of the security events. The information source for extracting the metrics is the repository of security events.

Integrated Metrics:

ACCESS_RISK—a value or scale that represents the risk of the access, based on one or more of the specific metrics described above such as RISK_FROM_SOURCE, ATTACKS_RISK, and NUMBER_OF_ATTACK_ATTEMPTS. Different methods can be used for combining the specific metrics into a single risk value. For example, the process can compute some weighted average between RISK_FROM_SOURCE, and ATTACKS_RISK (higher weight to ATTACKS_RISK), and multiply it by factor. The factor is based on the NUMBER_OF_ATTACK_ATTEMPTS, (if security event data is available)—a higher number yields a higher factor.

The framework for extracting the relevant data from the different information sources is common: Get as an input a policy rule violation, find all the items in the information source which their associated source-destination pair (denoted as <item-source, item-destination>) intersects with the source-destination pair of the policy rule violation (denoted as <violation-source, violation-destination>). i.e., item-source ∩ violation-source ≠φ and item-destination ∩ violation-destination ≠φ based on the rule type, and the type of the data item use attributes of the matching data items to compute metrics for the policy violation. The exact details of that process depend on the information source. For example, when searching for a match in the results of the security analysis the information items that can be found are attack steps or access risks. The attack steps are either members of the attack graph, or attack steps which were recorded during the analysis one step attacks from sources to destinations.

When searching the repository for security events, the match usually finds events that their source network node and destination network node are specific IP addresses. Violation of a full-access rule. a violation of full-access rule means that some required access is not possible in the network (usually due to routing constraints or access rules of devices). The severity of that violation might differ according to the importance of the connection, and the amount of access that is not supported. When the security model holds information on business assets and the damage associated with Availability security loss, that information can translated into a metric: DAMAGE_OF_NO_ACCESS—a numeric value or scale that is associated with the violated rule and expresses the damage of having no connection between source network node and destination network node. When part of the access specified in the rule is possible, that metric can take in account the relative amount of access that is not possible in computing the damage (for example, a multiplication of the rate of the non-possible access by the damage value of a full availability problem)

The method described above (FIG. 1), applies also for associating security metrics with policy access rules (rather than with violation of policy access rules). Metrics can be associated with both Connectivity rules and No-access rules.

We use the term Connectivity rules for policy access rules which allow or require access between source network nodes and destination network nodes (for example, limited-access rules and full-access rules). Connectivity rules can be associated with metrics of two categories: Security risk—measures for the security risk that the access imposes. These metrics might help in improving the security of the network (for example, installing IPS device when the access is required but it can be used for attacking the network). The specific metrics of the security risk category can be identical to those defined for violations of no-access rules. The computation methods can also be the same. Possible metrics: ACCESS_RISK, RISK_FROM_SOURCE, NUM_OF_VULS_ACCESSIBLE_FROM_SOURCE, CAN_BE_USED_FOR_ATTACK, ATTACKS_RISK, NUM_OF_EXPLOITABLE_VULS, NUMBER_OF_ATTACK_ATTEMPS.

When applying the method described above for associating security metrics with policy access rules, the attack graph nodes that are considered are those which represent access that matches the access specified in the policy access rule. A match means that there is a non-empty intersection between the source-destination combinations represented by the access node, and the source-destination combinations represented by the policy access rule.

Connectivity at risk, measures for the risk that a required access (full-access rule) which is possible in the network will be disturbed by different causes such as cyber-space attacks, occasional operation failures of network devices, and identification errors of prevention systems. These metrics might help to improve the network durability in the presence of such threats. The risk to a required connectivity might have different causes. The metrics can relate to each of these causes or to their aggregation. Some specific examples are: ATTACK_CONNECTIVITY_RISK—a numeric value or scale that expresses the risk of a connectivity failure as a result of cyber-space attacks (humans or worms). The risk combines (1) the likelihood that devices required for the access will not be available due to cyber space attacks, and (2) the expected damage of a missing connectivity. FAILURE_ACCESS_RISK—numeric value or scale that expresses the risk of a connectivity failure as a result of occasional failures of network devices. IPS_CONNECTIVITY_RISK—a numeric value or scale that expresses the risk of a connectivity failure as a result of IPS devices located along the access routes from the source to the destination. CONNECTIVITY_RISK—a numeric value or scale that expresses the risk of a connectivity failure. This metric is an aggregation of the different risk causes. The computation of the ATTACK_CONNECTIVITY_RISK can be done by: Performing access analysis from the source network node to the destination network node, recording the network devices which are used and an access graph which describes the possible access routes through the network devices. The access analysis can be performed under permissive assumptions regarding the routing decisions to take in account the recovery ability of dynamic routing protocols (e.g., routing to more than one neighbor). Thereafter, finding within the attack graph (computed by the security analysis) the likelihood for denial of service of network devices which are used for the access (as found by the access analysis), Computing the likelihood for a disconnection between the source network node and the destination network node in the access graph, based on the likelihood for failure of the network devices and Multiplying the likelihood for a disconnection by the expected damage as a result of no connectivity. The computation of FAILURE_ACCESS_RISK can be done is a similar way taking a-priory or statistical information regarding likelihood of device failures. The computation of IPS_ACCESS_RISK can relate to the active prevention rules of IPS devices and their false-positive rates (the likelihood of identifying mistakenly an innocent packet as malicious). The CONNECTIVITY_RISK can be calculated by computing the likelihood that at least one of the causes will happen, multiplied by the expected damage.

Metrics can be associated with No-access policy rules. Metrics for no-access policy rules (rules which prohibit access between the source network node and the destination network node of the rule) can point on de-facto communication between the source network node and the destination network node. Information on communication in the network resides (if available) in the communication event repository. A possible metric which can be extracted from that repository is: NUMBER_OF_NON_MALICIUS_PACKETS—the number of non-malicious packets from the source to the destination along some period of time. Such a metric can point on potential risk of enforcing the rule.

The security metrics associated with violation of policy rules (or with policy rules) are reported to the user. That report includes the details of the violation of the policy rule, and the metrics which were computed for it. Different media can be used for presenting the report. Examples, are PDF file, ASCII fie, or a GUI (graphical user interface) of a computer program. When using an interactive presentation method, the reported items can be filtered and ordered according to the different computed metrics or according to combination of these metrics. The report can also present aggregated views of the reported items. For example, aggregating reported items according to source network node and destination network node of violation of policy access rules. In that way, the user can get high level indications for the access security of areas in the network based on the metrics associated to policy access rules and violations of policy access rules that their destination is within the network area. The user can also get metrics for the whole organizational network by aggregating, for example, the metrics of the different areas. The aggregate view of the metrics can be interactively explored by the user to show the metrics for the more detailed items.

Figure 2:
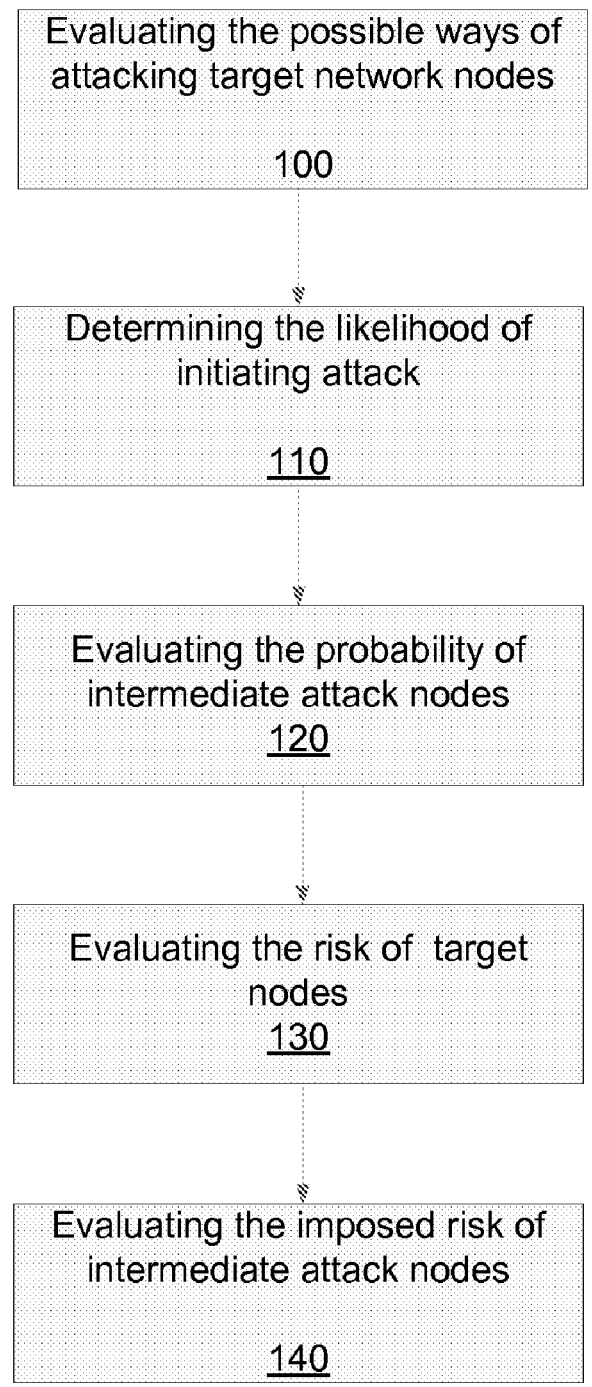
FIG. 2 is a flow diagram showing a method of conducting security analysis in a computer network in accordance with one embodiment of the present invention.

The security analysis of the network (step 50 of FIG. 1) might be performed using several different methods. The methods might include analysis of possible multi-step or single-step attacks in the network, or by assessing vulnerabilities which were found to be accessible by the violated access. Security analysis methods might be used according to the availability of data in the model and according to user preferences. Some of the methods can be applied independently of the access policy; other sub-analyses might be focused on the source-destination relations that are specified in the policy violations. FIG. 2 is a flow diagram showing one possible method of conducting security analysis in a computer network in accordance with one embodiment of the present invention. This method finds possible network attacks originated at threat origins—potential attack starting network nodes specified in the security model. The method then asses the likelihood and risk level of the attack steps which are used for the attacks. The attacks which are found might include one step or multi steps. In multi-step attacks the attacker achievement on the first node enables attacking a second node, and so forth. The attacks target network nodes might be assets—business assets or infrastructure assets (network devices) which are affected by the attack (i.e., facing a security loss such as confidentiality, integrity, or availability).

Step 100 finds the possible ways to attack target nodes from the start nodes. This analysis can be done by performing attack simulation on the security model, using information on the network, threats, vulnerabilities, and assets. A technique for attack simulation has been described, for example, by Cohen et al. [4]. The attack simulation stores its results in an attack graph. The attack graph records using graph nodes and links the attacker achievements (state of services) and the transitions (attack steps or actions) which enabled these achievements. For example of attack graph representation see FIGS. 4 and 5, and the later sections that describe them. The method evaluates the risk level associated with each of the attack graph nodes.

Step 110 determines the likelihood of initiating attacks at the start nodes. The term p_arrive is used to represent the probability of attacks to arrive at a certain node (i.e., achieving the achievement or performing the attack action the node represents). p_arrive of a certain start node is the likelihood of attackers to initiate an attack from the start node. The probability might depend on the network location and the type of the attacker the start node represents. The probability might be determined based on user input or according to a-priori knowledge of system has. The initial p_arrive value for all other network nodes is set to zero.

Step 120 includes the evaluation of the probability (p_arrive) of attacking (arriving at) intermediate and target nodes from the start nodes. Arriving at an intermediate or target node from a certain start node might involve passing through multiple intermediate nodes positioned between the node and the certain start node. The computation of p_arrive for intermediate nodes and target nodes can be done by using a forward propagation algorithm which starts at the attack starting nodes, and updates iteratively the p_arrive of each encountered node. The p_arrive value of encountered node is set to the local success likelihood of the node itself (p_success) multiplied by the maximal probability of arriving at each of its predecessor nodes i.e. maximum of the p_arrive values of its predecessors. A modification to the p_arrive value of a node requires updating the p_arrive value of its successors. The process halts when there are no more updates to be performed. A halt is guaranteed due to the monotonic nature of the updates. For nodes which represent vulnerability exploitation, the local success likelihood p_success is determined according to properties such as difficulty of exploiting the vulnerability, the skill level and the capabilities of the attacker, the age of the vulnerability, the commonality of the vulnerability, etc. The p_success likelihood of nodes which represent other actions can be set to 1 or to some other a-priori value.

Step 130 includes the evaluation of a risk associated with the target nodes. This is an optional step. A target node usually represents a security loss of an asset (business assets or infrastructure asset). The risk associated with each of the target nodes is the multiplication of result of its p_arrive probability and its damage value as appears in the security model (the damage associated with the security loss of the corresponding asset). Alternately, more accurate risk approximation method, however using more complex computation, can be performed by using Bayesian networks for representing the problem Step 140 includes the evaluation of the level of risk intermediate nodes impose on target nodes. The imposed risk (imposed_risk) of an intermediate node represents the risk which can be caused by attack scenarios (attack paths) in which the node participates. The imposed risk of an intermediate node takes into account the probability p_arrive to arrive at the intermediate node from the starting nodes, the probability to arrive from the intermediate node to the target nodes, and the damage associated with these target nodes. An approximation for that value can be computed as follows:

Compute for each node n and for each asset a the property relative_imposed_risk(n, a). The property represents the maximal risk which the node n can impose to asset a using a singe path which starts at n (assuming the predecessors of n have been achieved with likelihood of 1). This can be done, for all the nodes of the graph, by using a backward propagation algorithm which starts at the attack target nodes, and updates iteratively the relative_imposed_risk of each encountered intermediate node. The relative_imposed_risk of the target node which represents asset a, is the damage value associated with the asset. The relative_imposed_risk of a node n is the local success likelihood of the node multiplied by the maximum of the relative_imposed_risk values of its successors (relating to asset a). A modification to a relative_imposed_risk value of a node requires updating the relative_imposed_risk value of its predecessors. The process halts when there are no more updates to be performed. A halt is guaranteed due to the monotonic nature of the updates. An alternative approximation (more efficient to compute, less accurate) can be done by computing for each node only single relative_imposed_risk value rather than a value for each asset.

Update the imposed risk (imposed_risk) of each intermediate node n. The imposed_risk(n) of each intermediate node n is updated by summing its relative_imposed_risk(n, a) properties for all the assets, and multiplying that sum with the likelihood to arrive at the node: p_arrive. More precisely: the imposed_risk of the certain intermediate node n is set to be p_arrive(n)*relative_imposed_risk(n)/p_success(n), where relative_imposed_risk(n) is the sum of the relative_imposed_risk(n, a) values of node n, for all the assets. Note that p_arrive was computed for the nodes as part of computing the risks for the end points.

Alternately, more accurate techniques for risk computation can be also used. For example, techniques which transform the attack graph into a Bayesian network (or variation of that representation), and using solvers of Bayesian networks for computing the likelihood of using a network node in attacks, and accordingly computing the risk.

The risk found for the graph nodes is recorded with the attack graph. The risk can be retrieved later and used for assessing the risk of a specified access.

Alternately, the above methods (of multi-step attacks and imposed risk calculation), might be infeasible in certain cases (for example, when threat origins are not specified or vulnerabilities are missing in the model). In this case, a simpler analysis can be used. The method is based on one step attacks from the source network nodes to the destination network nodes. It checks if the access specified in a violation of policy rule enables an attacker located at one of the source network nodes, to perform attack steps on one of the destination network nodes. The method also estimates the risk level of these steps.

Let s be the source of the violating access and d its destination (typically s is a set of network nodes and d is a set of network nodes and services on these nodes). The check can be done in different levels based on the data available in the model.

When no vulnerability data is available in the model for the destination network nodes, the risk level of the possible access can be estimated according to the likelihood of the source network node to be under the control of an attacker, the likelihood for vulnerabilities on the destination network node services, and the importance of the destination network node hosts (the potential impact). More specifically, if the destination d represents a single port on a single host:

$$Risk\_level(s,d)=LikelihoodForControl(s)*LikelihoodForVulnerabilities(d)*PotentialImpact(d)$$

where:

LikelihoodForControl is the likelihood that the hosts within the start network node will be controlled by an attacker. This can be specified for locations in the network or for category of locations (Internet, DMZ, Internal, . . . ).

LikelihoodForVulnerabilities represent the likelihood for the existence of exploitable vulnerabilities on the destination. This likelihood depends on whether or not the destination host and service appear in the model, and on a-priory knowledge on vulnerability rates for the service or the port.

PotentialImpact represents the potential impact of attacks on the destination. This depends on the importance of the destination host. It can be deducted from the participation of destination hosts in business assets and the damage rules associated with these business assets.

If the destination d represents a set of services (or ports) on a set of hosts, the risks of the specific services within d are accumulated to produce the accumulated risk of d. Note that since the factors of the formula are estimated numbers, the formula produces only rough approximation for the risk level. However, the computed values can be used for differentiating between access policy violations based on the category of the source network node (e.g., Internet vs. Internal network), the criticality of the destination network node (e.g., server farms vs. desktops), and the vulnerability rates (or attack rates) of the destination services.

When vulnerabilities data is available, a simulation of one step attack from the source network nodes to the destination network nodes can be performed (as done for finding multi-step attacks described above FIG. 2). The simulation of one step attack assumes that attackers (threats) of different types (human attacker, worms of different profiles) took control on nodes of the source (s), and examines which attack steps can be performed remotely from s to d by the attacker. The feasibility check of the attack steps takes in account the capabilities of the attackers, the preconditions and effects of exploiting vulnerabilities related to the services of the destination d, and the effect of protection systems (like IPS or worm protection systems). For example, assume that NetBIOS access from the DMZ into internal networks is forbidden by the policy, and a violation was found to this rule: port 137/TCP of host h2 in the internal network is accessible from host h1 in the DMZ. The method checks if the access from h1 to h2 port 137/TCP can be used for attacking h2 (assuming the attacker has control on h1). The analysis can find, for example, that either human or some type of worm can use the access to exploit vulnerability v1 on host h2, achieving control on the machine.

The method records for each violation of policy rule the possible attack steps. The recording of an attack step includes the threat types (human, worm type, . . . ) that are able to perform it, the vulnerability which was used, and the possible attacker achievements. The check also computes and records the risk of the access. This risk can be computed by accumulating the risks of exploiting vulnerabilities on the destination d. The risk level of exploiting from a certain source network node s a vulnerability v on a certain destination network node d can be computed by the formula:

$$RiskLevel(s,v,d)=LikelihoodForControl(s)*LikelihoodForExploitingVulnerability(v)*PotentialImpact(d)$$

The LikelihoodForExploitingVulnerability is actually the p_success probability described in the risk computation of multi-step attacks. The recorded risk can be used in a later stage for associating a security metric to policy access violations.

A similar analysis can be performed for computing attack steps and risks associated with connectivity access rules (access rules which require access from source to destination, such as full-access rules). Although the access here is required for operational purposes, indications on possible attack steps which the access enables and their estimated risk can help in improving the security using some other means like IPS devices.

Figure 3:
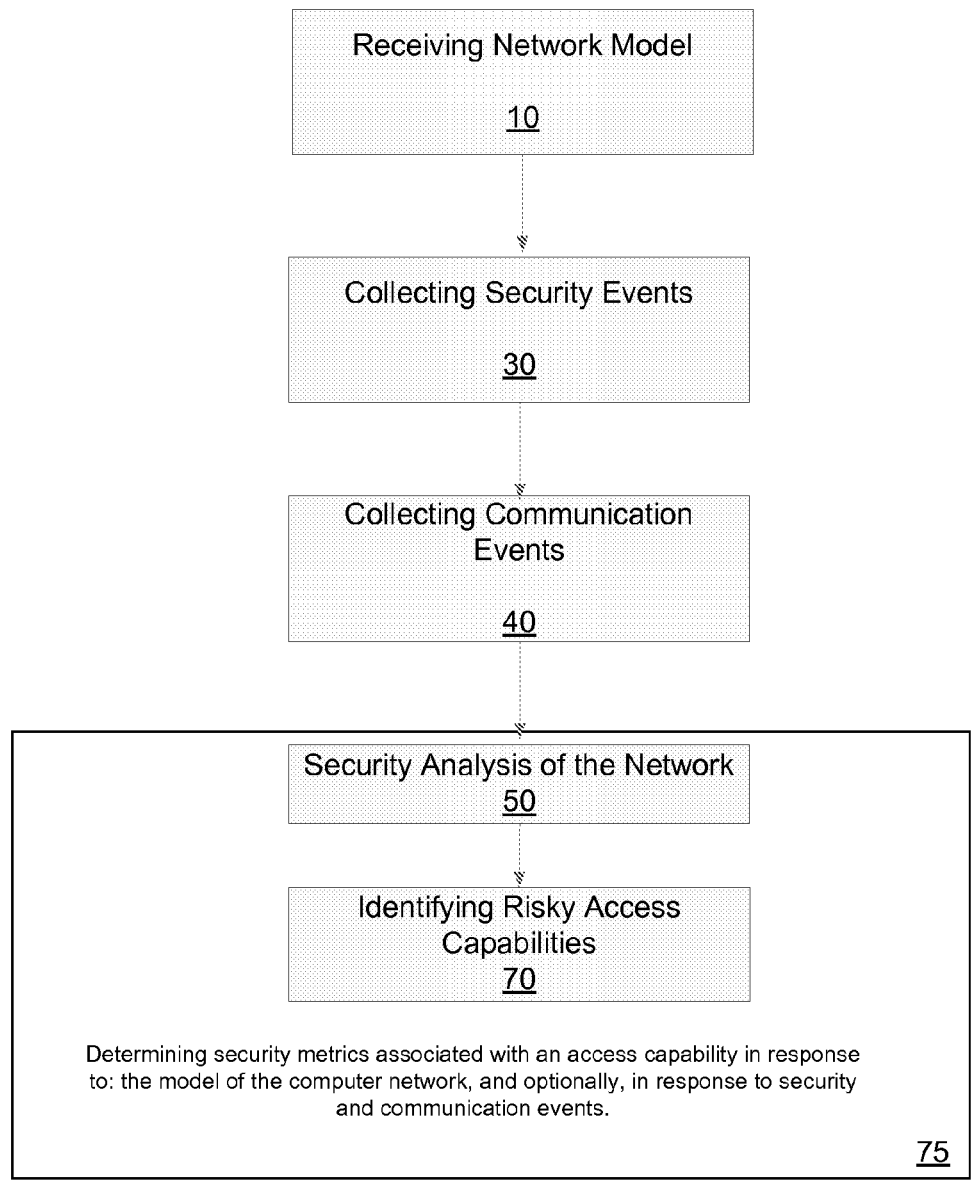
FIG. 3 is a flow diagram a showing a method of associating security metric to an access capability in a computer network in accordance with one embodiment of the present invention.

FIG. 3. is a flow diagram showing a method of associating security metrics to access capabilities within a computer network in accordance with one embodiment of the present invention. An access capability in the network can be of different types: the access possibility between specified source and destination nodes in the network (e.g., an access from the Internet to port 80 of servers h1 and h2 in the DMZ network), the possibility of access between specified source and specified destination through a specified network device (e.g., an access through firewall 5 from any source addresses to port 80 of server h1), or an Allow ACL rule of a specified network device which permits access from the source of the rule to the destination of the rule (e.g., access rule 9 of firewall 5 which permits access from any address to port 80 of DMZ hosts). Associating security metrics with access capabilities enable security people to understand risk associated with access that is possible in a computer network and with ACL rules of firewalls. This can serve, for example, security processes of auditing firewalls, or examining changes or proposed changes in firewall rules or firewall behavior. In processes that examine changes, the user might be interested in associating security metric with new possible access in the network. In audit processes the user might be interested in being informed on the most risky access possibilities in the network or in the most risky ACL rules of an audited firewall. Such information is valuable in addition or independently to security metrics of policy access rules or of violations of policy access rules, since an access policy for large networks is in many cases partial and does not provide a complete specification of the desired access behavior in the network.

Steps 10, 30 and 40 are performed similarly to the corresponding steps presented in the method described for associating security metrics to violations of access policy.

Step 75 includes determining security metrics associated with access capabilities in response to the model, and optionally in response to security and communication events. The step comprises step 50 and step 70. Step 50 is performed similarly to the corresponding step presented in the method described for associating security metrics to violations of access policy. The details level of the attack graph which is used determines which type of access capabilities could be associated with security metrics. Step 70 identifies risky access capabilities and reports risky access capabilities by searching the attack graph for nodes that represent access and which their imposed risk is higher than a specified threshold. Step 70 can also identify access capabilities with a relatively high rate of related security events by searching the security event repository. The risky access capabilities are reported to the user. The report includes the details of the access capability (source network node, destination network node, and destination ports in case of possible network access, or ACL rule identifier) and the metrics which were computed for it. Different media can be used for presenting the report. Examples, are PDF file, ASCII fie, or a GUI (graphical user interface) of a computer program. When using an interactive presentation method, the reported items can be filtered and ordered according to the different computed metrics or according to combination of these metrics. The report can also present aggregate views of the reported items. For example, aggregating reported items according to their source or destination network nodes. In that way, the user can get high level indications for the access security issues of areas in the network based on the metrics associated to risky access items that their destination is within the network area. The user can also get metrics for the whole organizational network by aggregating, for example, the metrics of the different areas. The aggregate view of the metrics can be interactively explored by the user to show the metrics on the more detailed items.

The method can be augmented to report only on risky access which has not been covered by policy rules. This is done by supplying the rules of the network access policy as an additional input to the method. The report on risky access which is not covered by policy rules can be used for two purposes: (1) resolving the security problem, and (2) extending the coverage of the policy rules.

Figure 4:
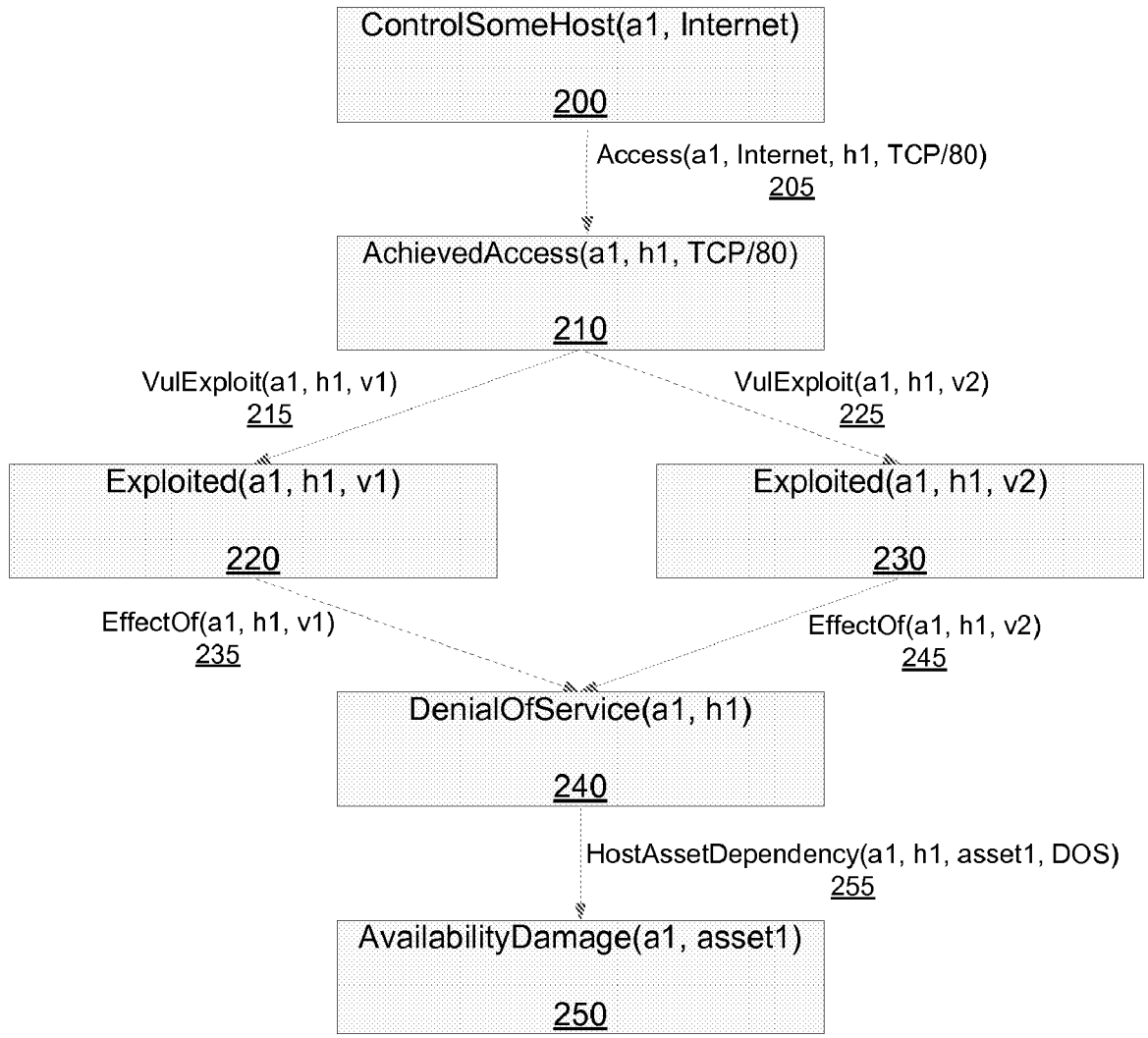
FIG. 4 is a schematic diagram showing an exemplary attack graph in accordance with one embodiment of the present invention.

FIG. 4 is a flow schematic diagram showing an exemplary attack graph in accordance with one embodiment of the present invention. The attacks which are found might include one step or multi steps. In multi-step attacks the attacker achievement on the first node enables attacking a second node, and so forth. The attacks end-points might be business assets or infrastructure assets (network devices) which are affected by the attack (i.e., facing a security loss such as confidentiality, integrity, or availability).

The analysis can be done by performing attack simulation on the security model, using information on the network, threats, vulnerabilities, and assets. In particular, the attack simulation takes in account attack characteristics of network nodes (the likelihood that an attacker already has a control on the node, the vulnerabilities on the services of the node, open ports, countermeasures installed on the node, etc.), the topology of the network, the configuration of network devices (firewalls, routers, load balancer, IPS, worm protecting systems, etc.), the business assets and their relation to network nodes. A technique for attack simulation has been described, for example, by Cohen et al. [4]. The attack simulation stores its results in an attack graph. The attack graph records using nodes and links the attacker achievements (state of services) and the transitions (attack steps or actions) which enabled these achievements.

The nodes of the attack graph represent regular achievements of attackers such as DOS (denial of service) of a host, or taking control on a host, and intermediate technical achievement that represent, for example, the exploit of vulnerabilities ("Exploited") and the usage of possible access in the network ("AchievedAccess"). These nodes are also referred to as graph nodes. They are not necessarily representative of network nodes.

The attack graph shows how an attacker (a1) located in the Internet can cause damage to asset1 of the organization.

Box 200, represents the state where an attacker, initially located at the Internet.

Box 210, represents the state where the attacker achieved access to port TCP/80 (i.e., establishes a TCP session) of host h1 by the activity 205. The achieved access is later used for exploiting vulnerability v1 or vulnerability v2 on host h1.

Box 220 represents the state in which vulnerability v1 on host h1 is exploited by the activity 215.

Box 230 represents the state in which vulnerability v2 on host h1 is exploited by the activity 225.

Box 240 represents the state in which a denial of service (DOS) is caused to host h1 by the activities 235 and 245.

Box 250 represents the state in which the denial of service (DOS) of h1 causes availability problem for asset1 which uses host h1 by the activity 255.

In the above graph the graph nodes represent the achievements and the links represent the actions (the transitions).

The attack graph (or an associated data structure) also records the details of the access that enabled the Access actions. An access record might include: The source and the destination of the access, a reference to the Access action in the attack graph that used the access, network devices (routers, firewalls, IPS devices, . . . ) that where involved in the access, access graph which describes the possible access routes from the sources to the destinations through the network devices, additional attributes of the access (encrypted, authenticated, . . . ). These access records are later used for associating attack related metrics with policy rules and policy violations. Appropriate indexes or data structures can be used to enable an efficient search of these records—finding records that match a specified access (source, destination, and the like). The attack simulation can be applied for finding both human and worm attacks. Worm attacks can be of known worms or of potential worms. Finding worm attacks however requires some extensions to the technique described in [4]. The feasibility check of worm attack steps, should relate to the methods which that particular worm uses to attack other nodes and copying its code to new nodes. In particular the propagation of worm W from node X to node Y is possible if: The destination network node Y has the services and the vulnerabilities which are required for the propagation of worm W, the required services on Y are accessible from X (can be done by an access check in the model), the preconditions for exploiting the vulnerabilities by the worm are matched, the backward access from Y to X, which is required for copying the code of the worm, exists (can be done by an access check in the model).

Figure 5:
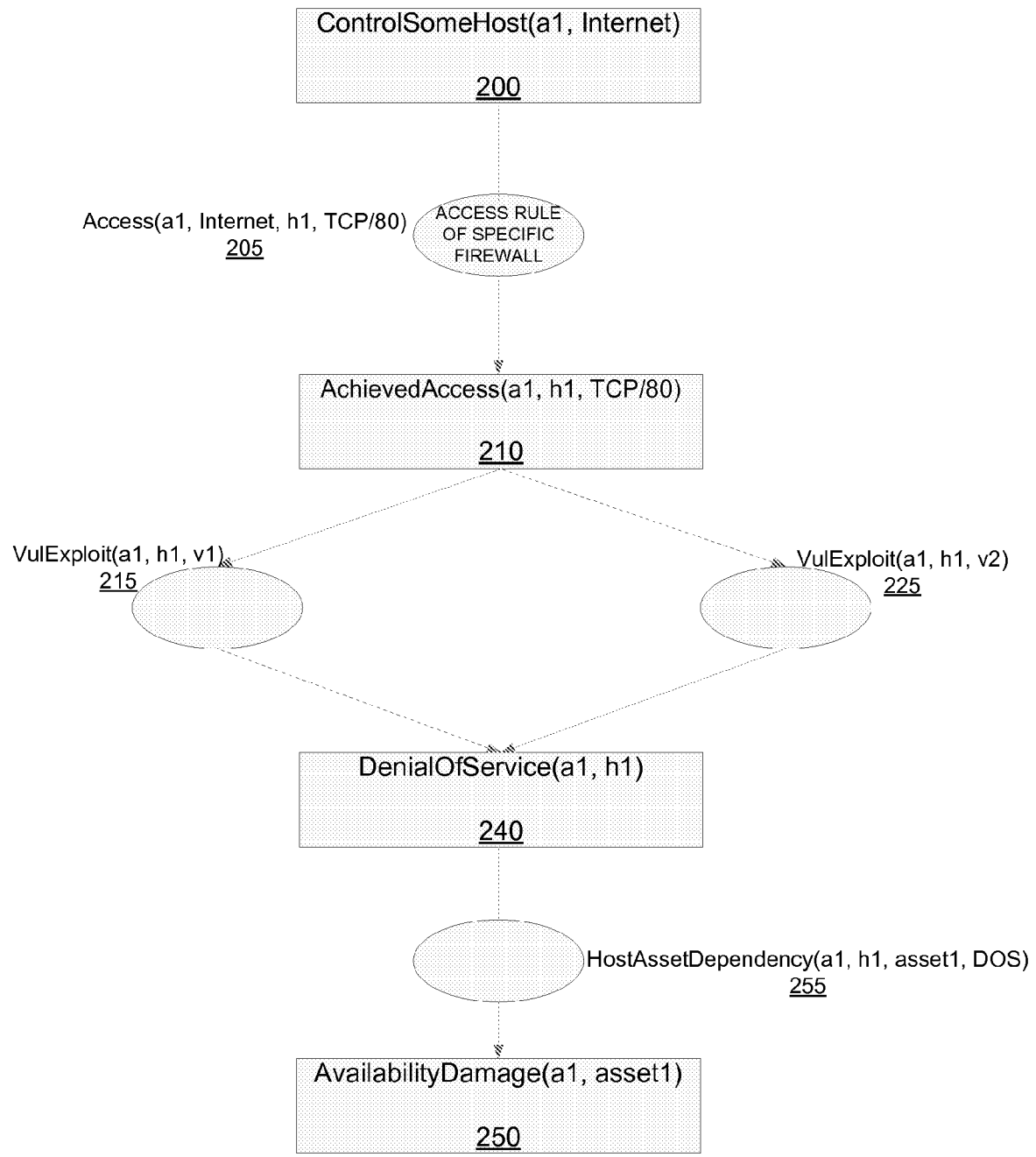
FIG. 5 is a schematic diagram showing an additional exemplary attack graph in accordance with one embodiment of the present invention.

FIG. 5 is a schematic diagram showing an additional exemplary attack graph in accordance with one embodiment of the present invention. This diagram describes an alternative way for representing the attack graph. The graph nodes are used for representing both achievements and actions. In the figure, rectangle nodes represent achievements, while oval nodes represent attack steps (actions). The set of actions and achievements that appear in the figure is only an example. Other variations of the set of actions and achievements can be used for representing attacks in the attack graph. Steps 210, 215, 225, 240, 250 and 255 in this diagram are performed similarly to the corresponding steps of the exemplary attack graph described in FIG. 4.

Figure 6:
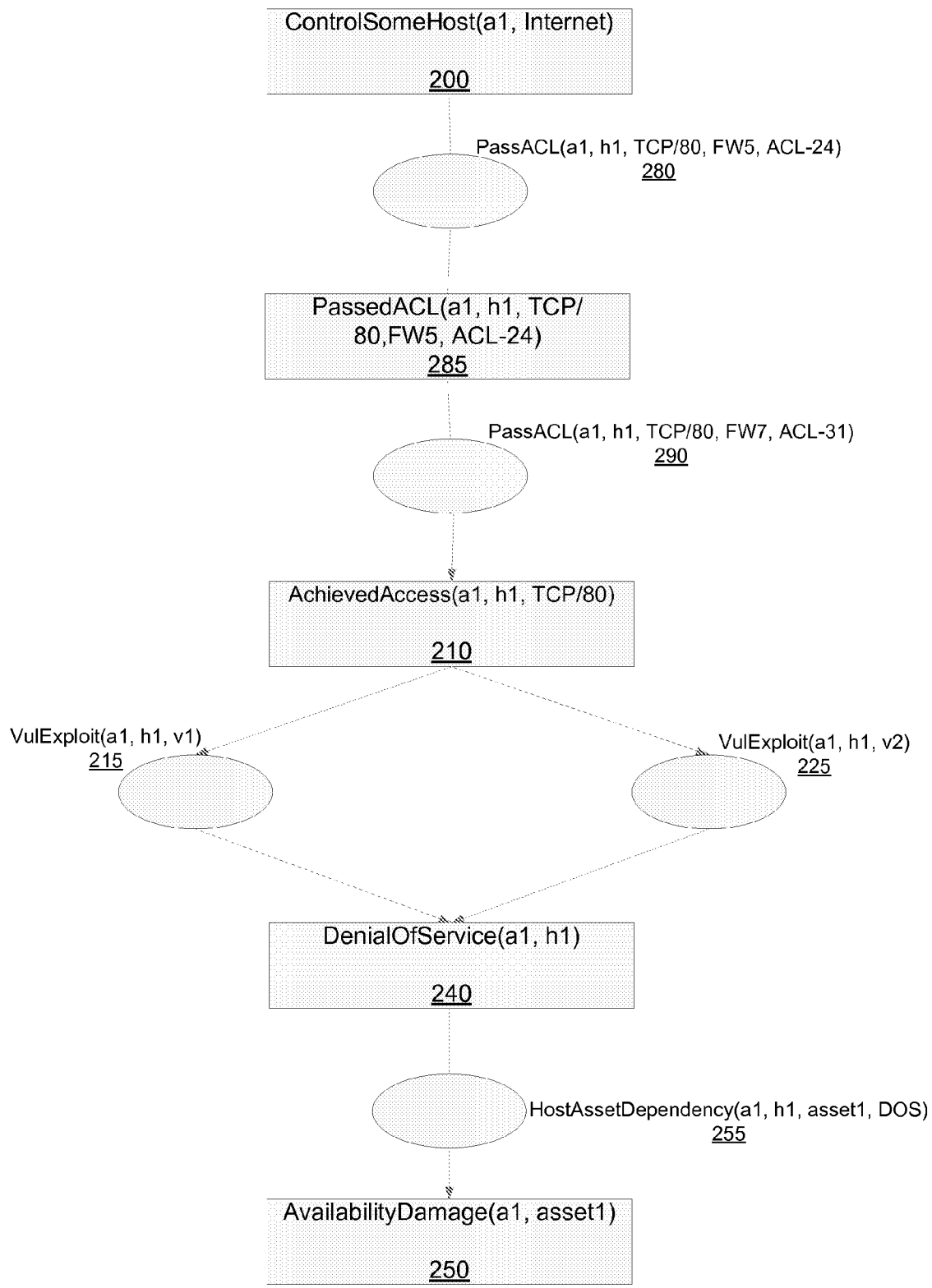
FIG. 6 is a schematic diagram showing an exemplary detailed attack graph which includes also access steps of packets through network devices in accordance with one embodiment of the present invention.

FIG. 6 is a schematic diagram showing an exemplary detailed attack graph which includes also the network devices in accordance with one embodiment of the present invention. The detailed attack graph is used for associating security metrics with ACL rules of network devices. The method described for associating security metrics to policy violations can also identify and report risky access rules of network devices. An access rule is risky when the communication it allows can be used for attacking the network, and cause significant damage. The identification of risky access rules is done similarly to identifying risky access a: first approximating the risk level of the end points of the attack graph (business and information assets), then approximating the risk level which the intermediate and start nodes impose. The detailed attack graph which use action nodes to represent the event of passing through a network device enables the association of risk level to nodes which represent passing through network devices, using particular ACL rules.

Steps 200, 210, 215, 225, 240, 250 and 255 in this diagram are performed similarly to the corresponding steps of the exemplary attack graph described in FIG. 4.

Step 280 represents the action of passing through firewall 5 and the allowed access by access rule 24.

Step 285 represents the state in which the attacker's packet passed firewall 5 and access rule 24.

Step 290 represents the action of passing through firewall 7 and the allowed access by access rule 31.

The information about the rules which allow the access can be recorded while performing the access analysis. In general, graph nodes of the type PassACL and PassedACL are part of sub-graphs within the attack graph which describe the possible access routes between the source and the destination of a required access (required for the attack) These graph nodes are associated with risk attributes like any other intermediate graph node. The risk of each PassACL graph node can be used to associate security metrics with the ACL rule it represents, or with the particular access possibility through the network device which the graph node represents.

Another metric which can be used for ACL rules, is the number of vulnerabilities that the ACL rule enables to exploit (by enabling access to the services of the vulnerabilities). This metric can be computed by traversing the attack graph. In the example presented in FIG. 6, both rule 24 of FW5 and rule 31 of FW 7 enable the exploitation of two vulnerabilities.

Figure 7:
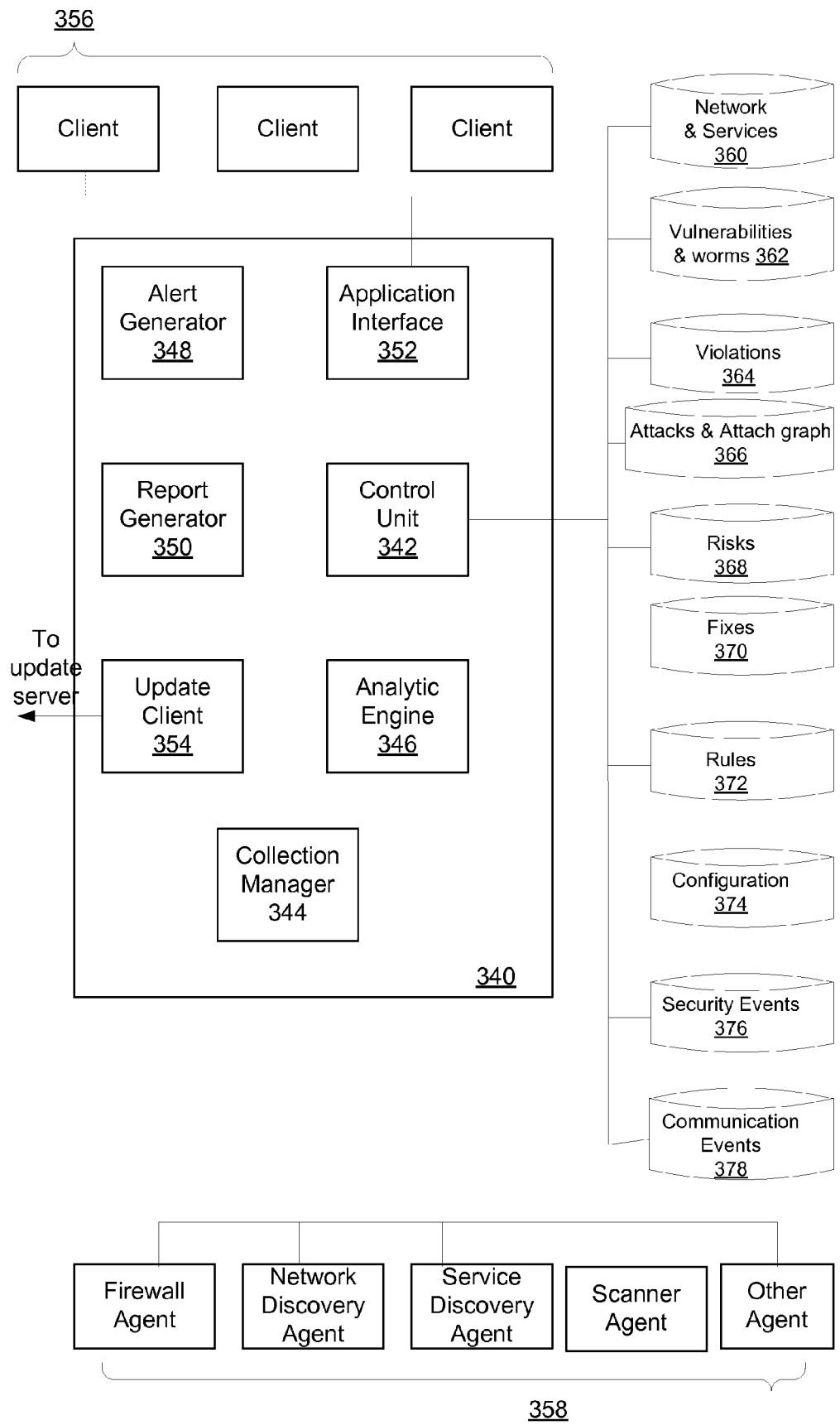
FIG. 7 is a block diagram depicting components of a system to detect and analyze risks in a computer network in accordance with one embodiment of the invention.

FIG. 7 is a block diagram depicting components of a system to detect and analyze risks in a computer network in accordance with one embodiment of the invention.

As shown, the system includes a server computer, 340 comprising server software, including a control unit module 342, a collection manager module 344, an analytic engine module 346, an alert generator module 348, a report generator module 350, an application interface module 352, and an update client module 354. The system also includes a client computer 356, comprising client software, including one or more information discovery agents 358, a network and services database 360, a vulnerabilities and worms database 362, a violations database 364, an attacks and attack graph database 366, a risks database 368, a fixes database 370, a rules database 372, and a configuration database 374. It is to be understood that, while, in the embodiment depicted, the server software and the client software are located at the server computer 340 and client computer 356, respectively, in other embodiments, the server software and the client software can be located at or executed from other computers or locations.

Control unit 342 coordinates communications between the other modules of the system. The control unit 342 also manages and directs the other modules in the system in performing their respective functions. For example, the control unit 342 activates scheduled tasks including data collection by the collection manager 344 data processing by the analytic engine 346, reporting by the reports generator 350, alerts by the alert generator 348, and updates by the update client 354. The control unit 342 also serves as the interface to and directs data flow from the network and services database 360, the vulnerabilities database 362, the violations database 364, the attacks database 366, the risks database 368, the fixes database 370, the rules database 372, the security events database 376, the communication events database 378 and the configuration database 374.

The collection manager 344 is responsible for coordinating network data collection performed by the discovery agents 358. The control manager 344 activates the agents, distils information received by the agents according to rules stored in the rules database 372 and the configuration database 374, and updates the network and services database 360 with changes and information received from the discovery agents 358. The discovery agents 358 collect network information regarding raw vulnerabilities, topology, services, and other information. Exemplary discovery agents 358 include firewall agents, network discovery agents, service agents, raw vulnerability scanner agents, and other agents. Specialized agents collect specific information from specific network nodes. For example, firewall agents, for example, collect access control lists and filtering rule sets; network discovery agents collect information about interconnections between network devices and hosts; network service agents collect lists of services operating on network hosts and devices; and raw vulnerabilities agents collect information regarding vulnerabilities as previously described herein. In some embodiments, the network topology, services, and vulnerability information may alternatively be provided in whole or in part by XML data or other data as specified by a user.

Discovery agents 358 can coexist with other of the discovery agents 358, or with the server software or client software on the same host. Discovery agents 358 operate according to scheduled frequencies as specified by the user and stored in the configuration database 374. In some embodiments, discovery agents 358 operate continuously. Alternatively, discovery agents 358 operate on demand when specified by a user, or activated by the collection manager 344, or otherwise event-driven.

Analytic engine 346 performs the actual analysis on the data collected by the discovery agents 358, vulnerabilities stored in the vulnerabilities database 362, rules stored in the rules database 372, security events stored in the security events database 376 and communication events stored in the communication events database 378. The analytic engine 346 contains a software functions which calculate vulnerabilities with logic, determine potential start and end points for attack routes, perform attack simulation, generate lists of possible attacks, calculate consequences of possible attacks, determine probabilities associated with possible attacks, rank actual vulnerabilities, perform security analysis, assign security metrics to policy rules, assign security metrics to security rules violations, estimate the possible risk of an access, present fixes, and perform other analytic actions as further described herein. The analytic engine 346 operates according to scheduled frequencies as specified by the user and stored in the configuration database 374. In some embodiments, the analytic engine 346 operates continuously. Alternatively, the analytic engine 346 operates on demand when specified by a user or directed by the control unit 342, or can be otherwise event-driven.

The alert generator 348 issues alerts according to vulnerabilities, risks, or violations detected as specified by preferences stored in the configuration database 374. For example, the alert generator 348 issues alerts that may lead to immediate action items such as extremely high risk vulnerabilities. The alert generator 348 operates according to scheduled frequencies as specified by the user and stored in the configuration database 374. In some embodiments, the alert generator 348 operates continuously. Alternatively, the alert generator 348 operates on demand when specified by a user or directed by the control unit 342, or can be otherwise event-driven.

The report generator 350 creates reports of analysis results, system activities, rule sets, and other items as specified by a user. Reports are generated in Rich Text Format, Portable Document Format, and other report formats known in the art. The report generator 350 operates according to scheduled frequencies as specified by the user and stored in the configuration database 374. In some embodiments, the report generator 350 operates continuously as in the case of creating log files of system activities. Alternatively, the alert generator 348 operates on demand when specified by a user or directed by the control unit 342, or can be otherwise event-driven.

The application interface 352 provides functions that enable the modules of the server software and the client software to communicate with each other. For example, the application interface 352 coordinates communications between the client computers 356 and the control unit 342, the collection manager 344, the analytic engine 346, the alert generator 348, the report generator 350, and the update client 354. The application interface 352 also supports a graphical user interface ("GUI") at the client computers 356 or provided through client software, which permits users of the client computers or client software to conduct rules editing, to configure scheduled reports and alerts, to conduct interactive analysis, editing and browsing of the network model, vulnerabilities, and analysis results, to view the state of security of the network, to perform user management, to perform task management, to perform agent management, and to perform other activities in communication with the server software. In some embodiments, the client GUI is color coded according to risks presented by vulnerabilities detected.

The update client 354 is responsible for obtaining updates of the system. System updates are obtained from an update server operated by the assignee of the present application or from other servers as specified by the user or stored in the configuration database 374. Update information includes updates of the vulnerabilities rule set, updates of the system software and modules, updates of the discovery agents 358, updates regarding vulnerability fixes, and other information useful in the operation of the system.

The update client 354 operates according to scheduled frequencies as specified by the user and stored in the configuration database 374. In some embodiments, the update client 354 operates continuously checking for new updates or information. Alternatively, the update client 354 operates on demand when specified by a user or directed by the control unit 342. In some embodiments, the update client 354 operates upon receipt of a signed email or other instruction from the update server.

The server computer 340 is communicatively coupled to a number of databases 360-378 which store data used by the system to detect and analyze risks in a computer network. In some embodiments, two or more of the databases 360-378 can be combined into a single database.

The network and services database 360 stores information regarding the network topology and network services, which can include service configuration information. The vulnerabilities database 362 stores information regarding vulnerabilities including raw vulnerabilities collected by the network discovery agents 358 and the vulnerabilities rule set used to add logic to raw vulnerabilities.

The violations database 364 can store policy violations detected by the system, alerts generated and their status, and reports generated, or, in some embodiments, information such as the alert information and the report information can be stored in one or more other databases.

The security events database 376 stores malicious communication events detected by intrusion prevention systems (IPS), intrusion detection systems (IDS), worm protection systems and security information management systems (SIM).

The communication events data base 378 stores information about communication events gathered for example by sniffers installed in the network, network devices logs and by intrusion detection systems configured to track some kind of non malicious communication.

The attacks database 366 stores analysis results regarding attacks including attack graphs, attack routes, start points, end points, risk level, and other similar information.

The risks database 368 stores probability data regarding the likelihood of possible attacks occurring, and can store potential damage data associated with each of several attack scenarios, it also stores the security metrics assigned to policy rules and violations of policy rules. The fixes database 370 stores information regarding how to eliminate and fix vulnerabilities detected by the system. The rules database 372 stores filtering rules which contain assertions for the existence of assets or vulnerabilities, policy rules regarding permitted access and services, and business rules regarding threats, damages, and dependencies. The configuration database 374 stores information regarding users, system security, agent preferences, task scheduling, alerts and reports configuration, and other configuration information used by the system. In some embodiments, the data stored in the network and services database 360, the vulnerabilities database 362, the violations database 364, the attacks database 366, the risks database 368, the fixes database 370, the rules database 372, the security events database 376, the communication events database 378 and the configuration database 374 is stored in a single database.

Figure 8:
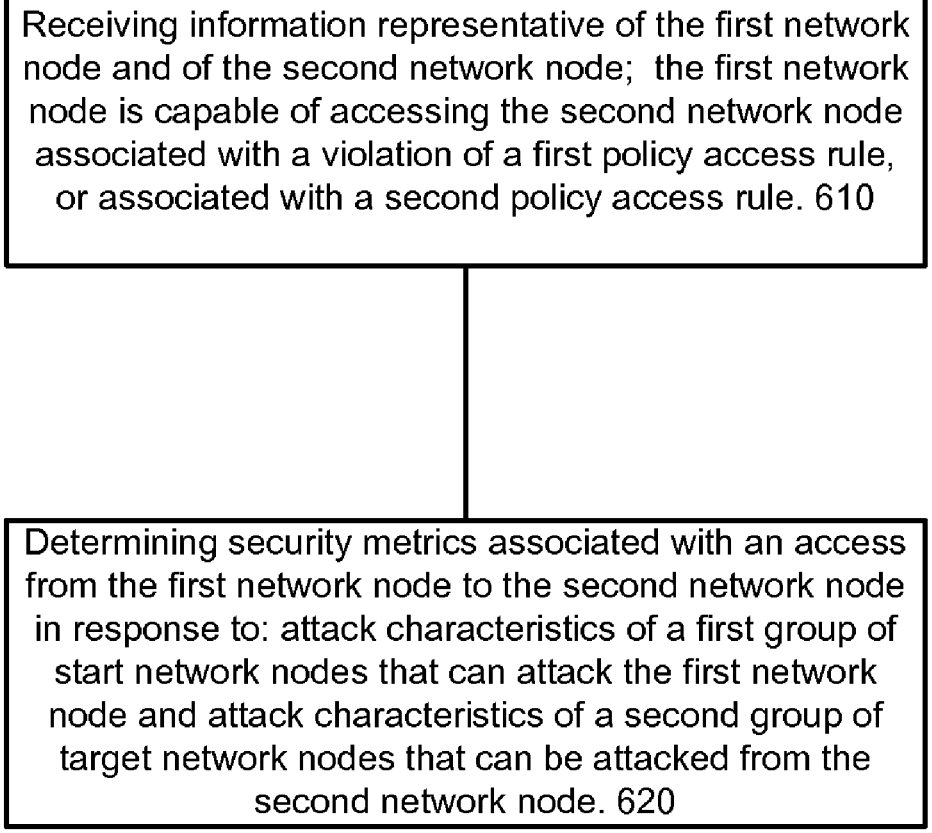
FIG. 8 illustrates a method according to an embodiment of the invention.

FIG. 8 illustrates method 600 according to an embodiment of the invention.

Method 600 starts by stage 610 of receiving information representative of the first network node and of the second network node. The first network node is capable of accessing the second network node associated with a violation of a first policy access rule, or associated with a second policy access rule.

Stage 610 is followed by stage 620 of determining security metrics associated with an access from the first network node to the second network node in response to: attack characteristics of a first group of start network nodes that can attack the first network node and attack characteristics of a second group of target network nodes that can be attacked from the second network node.

Conveniently, method 600 includes receiving actual security events and wherein the determining is responsive to the actual security events.

Conveniently, method 600 includes receiving actual communication events and wherein the determining is responsive to the actual communication events.

Conveniently, method 600 includes evaluating a likelihood of an initiation of an attack at a certain start network node of the first group, and evaluating a probability of attacking a certain target network node of the second group.

Conveniently, method 600 includes evaluating risk level associated with the certain target node.

Conveniently, method 600 includes evaluating a probability of passing through multiple intermediate graph nodes positioned between the certain target network node and the certain start network node.

Conveniently, the intermediate graph nodes includes a successor graph node that is preceded by multiple predecessor graph nodes; and the evaluating includes evaluating a probability of accessing the successor graph node in response to a maximal probability of accessing each of the multiple predecessor graph nodes.

Conveniently, method 600 includes evaluating an imposed risk associated with a certain intermediate graph node out of multiple intermediate graph nodes positioned between the certain start network node and the certain target network node in response to a risk associated with the target network node and to probabilities of passing through at least one intermediate graph nodes positioned between the target network node and the certain intermediate graph nodes.

Conveniently, the multiple intermediate nodes include a predecessor network node that is succeeded by multiple successor network nodes; and method 600 includes evaluating a relative imposed risk associated with the predecessor network node in response to a maximal relative imposed risk associated with each of the multiple successor network nodes.

Conveniently, method 600 include evaluating an imposed risk associated with a certain intermediate graph node related to all assets of the target network node in response to the sum of imposed risks associated with each of the target network node assets.

Conveniently, method 600 includes determining a metric that represents an imposed risk which can be caused by one step attacks from the first network node to the second network node.

Conveniently, Conveniently, method 600 includes determining a metric that represents a number of vulnerabilities of the second node that can be exploited from the first node.

Conveniently, method 600 includes determining a metric that represents an imposed risk that attacks which use an access between the first network node and the second network node.

Conveniently, method 600 includes determining a metric that represents an imposed risk which can be caused by multi-step attacks from a start network node of the first group to a destination network node of the second group.

Conveniently, method 600 includes determining a metric that represents a number of attack attempts during a predefined period.

Conveniently, method 600 includes finding possible ways to attack nodes of the second group of nodes from nodes of the first group of nodes.

It is noted that method 600 can include at least one stage of the mentioned above methods.

Figure 9:
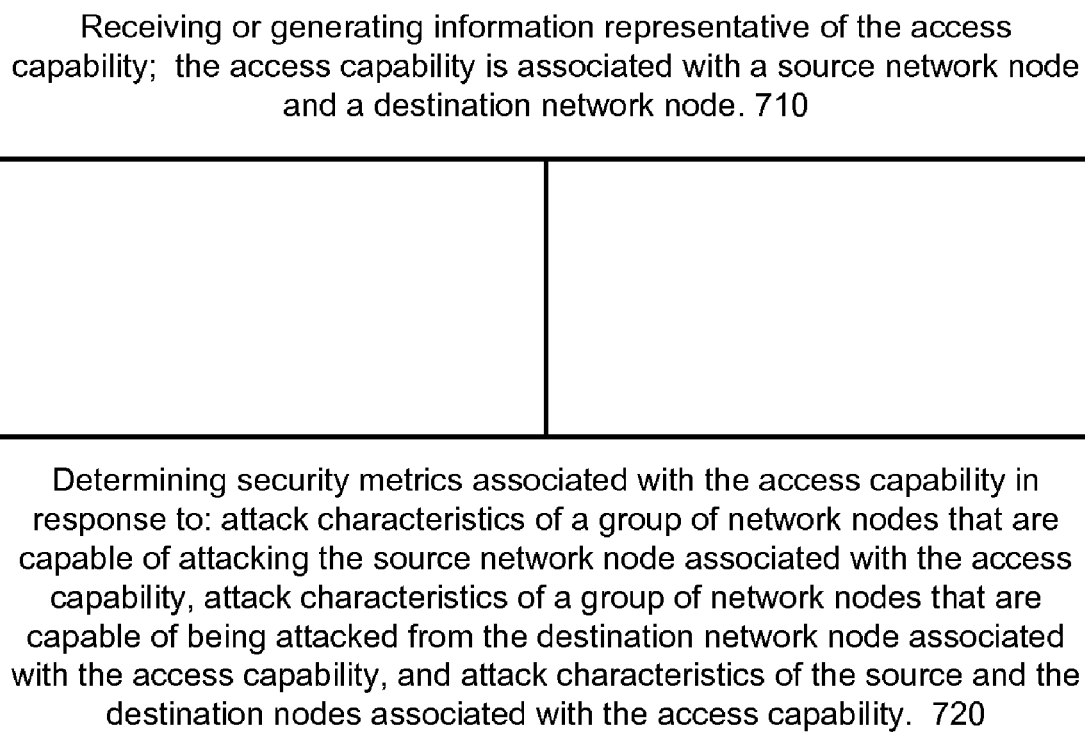
FIG. 9 illustrates a method according to an embodiment of the invention.

FIG. 9 illustrates method 700 according to an embodiment of the invention.

Method 700 starts by stage 710 of receiving or generating information representative of the access capability; wherein the access capability is associated with a source network node and a destination network node.

Stage 710 is followed by stage 720 of determining security metrics associated with the access capability in response to: attack characteristics of a group of network nodes that are capable of attacking the source network node associated with the access capability, attack characteristics of a group of network nodes that are capable of being attacked from the destination network node associated with the access capability, and attack characteristics of the source and the destination nodes associated with the access capability.

Conveniently, method 700 includes receiving actual security events and the determining is responsive to the actual security events.

Conveniently, method 700 includes receiving actual communication events and the determining is responsive to the actual communication events.

Conveniently, method 700 includes evaluating a likelihood of an initiation of an attack at a certain start network node, a probability of accessing a certain target network node from the certain start network node.

Conveniently, method 700 includes evaluating risk level associated with the certain target network node.

Conveniently, method 700 includes evaluating a probability of passing through multiple intermediate graph nodes positioned between the certain target network node and the certain start network node.

Conveniently, the multiple intermediate nodes include a successor network node that is preceded by multiple predecessor network nodes; and method 700 includes evaluating a probability of accessing the successor network node in response to a maximal probability of accessing each of the multiple predecessor network nodes.

Conveniently, method 700 includes evaluating an imposed risk associated with a certain intermediate node out of multiple intermediate nodes positioned between the certain start network node and the certain target network node in response to an imposed risk associated with the target network node and to probabilities of passing through at least one intermediate node positioned between the target network node and the certain intermediate graph nodes.

Conveniently, the multiple intermediate nodes include a predecessor network node that is succeeded by multiple successor network nodes and method 700 includes evaluating a relative imposed risk associated with the predecessor network node in response to a maximal relative imposed risk associated with each of the multiple successor network nodes.

Conveniently, method 700 includes evaluating an imposed risk associated with a certain intermediate graph node related to all assets of the target network node in response to the sum of the relative imposed risks associated with each of the target network node assets.

Conveniently, method 700 includes evaluating an imposed risk level associated with a certain intermediate graph node in response to the probability of accessing the intermediate graph node and the imposed risk associated with the intermediate graph node.

Conveniently, the information representative of the access capability includes information that represents an access through a network node using an ACL rule.

Conveniently, method 700 includes determining a metric that represents an imposed risk of attacks which use the access capability.

Conveniently, method 700 includes determining a metric that represents the number of attack attempts which use the access capability.

It is noted that method 700 can include at least one stage of the mentioned above methods.

The present invention can be practiced by employing conventional tools, methodology and components. Accordingly, the details of such tools, component and methodology are not set forth herein in detail. In the previous descriptions, numerous specific details are set forth, in order to provide a thorough understanding of the present invention. However, it should be recognized that the present invention might be practiced without resorting to the details specifically set forth.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

The invention claimed is:

1. A method for evaluating an access from a first network node to a second network node, the method comprises:
    receiving information representative of the first network node and of the second network node; wherein the second network node is accessible to the first network node and wherein an access of the first network node to the second network node is associated with a violation of a first policy access rule or associated with a second policy access rule;
    generating security metrics associated with an access from the first network node to the second network node in response to: attack characteristics of a first group of start network nodes that can attack the first network node and attack characteristics of a second group of target network nodes that can be attacked from the second network node; and
    wherein the method comprises evaluating a relative imposed risk associated with a predecessor network node in response to a maximal relative imposed risk associated with each of multiple successor network nodes; wherein the predecessor network node and the multiple successor network nodes are coupled to the first and second network nodes.

2. The method according to claim 1 further comprises receiving actual security events and wherein the determining is responsive to the actual security events.

3. The method according to claim 1 further comprises receiving actual communication events and wherein the determining is responsive to the actual communication events.

4. The method according to claim 1 wherein the determining comprises evaluating a likelihood of an initiation of an attack at a certain start network node of the first group, and evaluating a probability of attacking a certain target network node of the second group.

5. The method according to claim 4 wherein the determining further comprises evaluating risk level associated with the certain target node.

6. The method according to claim 4 wherein the evaluating comprises evaluating a probability of passing through multiple intermediate graph nodes positioned between the certain target network node and the certain start network node.

7. The method according to claim 6 wherein the multiple intermediate graph nodes comprise a successor graph node that is preceded by multiple predecessor graph nodes; and wherein the evaluating comprises evaluating a probability of accessing the successor graph node in response to a maximal probability of accessing each of the multiple predecessor graph nodes.

8. The method according to claim 5 further comprising evaluating an imposed risk associated with a certain intermediate graph node out of multiple intermediate graph nodes positioned between the certain start network node and the certain target network node in response to a risk associated with the target network node and to probabilities of passing through at least one intermediate graph nodes positioned between the target network node and the certain intermediate graph nodes.

9. The method according to claim 8 wherein the multiple intermediate nodes comprise a predecessor network node that is succeeded by multiple successor network nodes; and wherein the evaluating comprises evaluating a relative imposed risk associated with the predecessor network node in response to a maximal relative imposed risk associated with each of the multiple successor network nodes.

10. The method according to claim 8 further comprising evaluating an imposed risk associated with a certain intermediate graph node related to all assets of the target network node in response to the sum of imposed risks associated with each of the target network node assets.

11. The method according to claim 1 wherein the determining security metrics comprises determining a metric that represents an imposed risk which can be caused by one step attacks from the first network node to the second network node.

12. The method according to claim 1 wherein the determining security metrics comprises determining a metric that represents a number of vulnerabilities of the second node that can be exploited from the first node.

13. The method according to claim 1 wherein the determining security metrics comprises determining a metric that represents an imposed risk that attacks which use an access between the first network node and the second network node.

14. The method according to claim 1 wherein the determining a security metrics comprises determining a metric that represents an imposed risk which can be caused by multi-step attacks from a start network node of the first group to a destination network node of the second group.

15. The method according to claim 1 wherein the determining a security metrics comprises determining a metric that represents a number of attack attempts during a predefined period.

16. The method according to claim 1 further comprising finding possible ways to attack nodes of the second group of nodes from nodes of the first group of nodes.

17. A method for evaluating an access capability, the method comprises:
receiving or generating information representative of the access capability; wherein the access capability is associated with a source network node and a destination network node;
generating security metrics associated with the access capability in response to: attack characteristics of a group of network nodes that are capable of attacking the source network node associated with the access capability, attack characteristics of a group of network nodes that are capable of being attacked from the destination network node associated with the access capability, and attack characteristics of the source and the destination nodes associated with the access capability; and
wherein the method comprises evaluating a relative imposed risk associated with a predecessor network node in response to a maximal relative imposed risk associated with each of multiple successor network nodes; wherein the predecessor network node and the multiple successor network nodes are coupled to the source network node and the destination network node.

18. The method according to claim 17 further comprises receiving actual security events and wherein the determining is responsive to the actual security events.

19. The method according to claim 17 further comprises receiving actual communication events and wherein the determining is responsive to the actual communication events.

20. The method according to claim 17 further comprises evaluating a likelihood of an initiation of an attack at a certain start network node, a probability of accessing a certain target network node from the certain start network node.

21. The method according to claim 20 wherein the determining further comprises evaluating risk level associated with the certain target network node.

22. The method according to claim 17 wherein the evaluating a probability comprises evaluating a probability of passing through multiple intermediate graph nodes positioned between the certain target network node and the certain start network node.

23. The method according to claim 22 wherein the multiple intermediate nodes comprise a successor network node that is preceded by multiple predecessor network nodes;
and wherein the evaluating comprises evaluating a probability of accessing the successor network node in response to a maximal probability of accessing each of the multiple predecessor network nodes.

24. The method according to claim 17 further comprising evaluating an imposed risk associated with a certain intermediate node out of multiple intermediate nodes positioned between the certain start network node and the certain target network node in response to an imposed risk associated with the target network node and to probabilities of passing through at least one intermediate node positioned between the target network node and the certain intermediate graph nodes.

25. The method according to claim 24 wherein the multiple intermediate nodes comprise a predecessor network node that is succeeded by multiple successor network nodes; and wherein the evaluating comprises evaluating a relative imposed risk associated with the predecessor network node in response to a maximal relative imposed risk associated with each of the multiple successor network nodes.

26. The method according to claim 24 further comprising evaluating an imposed risk associated with a certain intermediate graph node related to all assets of the target network node in response to the sum of the relative imposed risks associated with each of the target network node assets.

27. The method according to claim 24 further comprising evaluating an imposed risk level associated with a certain intermediate graph node in response to the probability of accessing the intermediate graph node and the imposed risk associated with the intermediate graph node.

28. The method according to claim 17 wherein the information representative of the access capability comprises information that represents an access through a network node using an ACL rule.

29. The method according to claim 17 wherein the determining comprises determining a metric that represents an imposed risk of attacks which use the access capability.

30. The method according to claim 17 wherein the determining comprises determining a metric that represents the number of attack attempts which use the access capability.

31. A computer readable medium that is non-transitory, the computer readable medium having computer-readable code embodied therein for evaluating an access from a first network node to a second network node, the computer-readable code comprising instructions for:
receiving information representative of the first network node and of the second network node; wherein the second network node is accessible to the first network node and wherein an access of the first network node to the second network node is associated with a violation of a first policy access rule or with a second policy access rule;
generating security metrics associated with an access from the first network node to the second network node in response to: attack characteristics of a first group of start network nodes that can attack the first network node and attack characteristics of a second group of target network nodes that can be attacked from the second network node; and
evaluating a relative imposed risk associated with a predecessor network node in response to a maximal relative imposed risk associated with each of multiple successor network nodes; wherein the predecessor network node and the multiple successor network nodes are coupled to the first and second network nodes.

32. The computer readable medium of claim 31 wherein the computer-readable code comprises instructions for receiving actual security events and wherein the determining is responsive to the actual security events.

33. The computer readable medium of claim 31 wherein the computer-readable code comprises instructions for receiving actual communication events and wherein the determining is responsive to the actual communication events.

34. The computer readable medium of claim 31 wherein the computer-readable code comprises instructions for evaluating a likelihood of an initiation of an attack at a certain start network node of the first group, and evaluating a probability of attacking a certain target network node of the second group.

35. The computer readable medium of claim 31 wherein the computer-readable code comprises instructions for evaluating risk level associated with the certain target node.

36. The computer readable medium of claim 31 wherein the computer-readable code comprises instructions for evaluating a probability of passing through multiple intermediate graph nodes positioned between the certain target network node and the certain start network node.

37. The computer readable medium of claim 31 wherein the computer-readable code comprises instructions for evaluating a probability of accessing a successor graph node in response to a maximal probability of accessing each of multiple predecessor graph nodes.

38. The computer readable medium of claim 31 wherein the computer-readable code comprises instructions for evaluating an imposed risk associated with a certain intermediate graph node out of multiple intermediate graph nodes positioned between the certain start network node and the certain target network node in response to a risk associated with the target network node and to probabilities of passing through at least one intermediate graph nodes positioned between the target network node and the certain intermediate graph nodes.

39. The computer readable medium of claim 31 wherein the computer-readable code comprises instructions for evaluating a relative imposed risk associated with the predecessor network node in response to a maximal relative imposed risk associated with each of the multiple successor network nodes.

40. The computer readable medium of claim 31 wherein the computer-readable code comprises instructions for evaluating an imposed risk associated with a certain intermediate graph node related to all assets of the target network node in response to the sum of imposed risks associated with each of the target network node assets.

41. The computer readable medium of claim 31 wherein the computer-readable code comprises instructions for determining a metric that represents an imposed risk which can be caused by one step attacks from the first network node to the second network node.

42. The computer readable medium of claim 31 wherein the computer-readable code comprises instructions for determining a metric that represents a number of vulnerabilities of the second node that can be exploited from the first node.

43. The computer readable medium of claim 31 wherein the computer-readable code comprises instructions for determining security metrics comprises determining a metric that represents an imposed risk that attacks which use an access between the first network node and the second network node.

44. The computer readable medium of claim 31 wherein the computer-readable code comprises instructions for determining a security metrics comprises determining a metric that represents an imposed risk which can be caused by multi-step attacks from a start network node of the first group to a destination network node of the second group.

45. The computer readable medium of claim 31 wherein the computer-readable code comprises instructions for determining a metric that represents a number of attack attempts during a predefined period.

46. The computer readable medium of claim 31 wherein the computer-readable code comprises instructions for finding possible ways to attack nodes of the second group of nodes from nodes of the first group of nodes.

47. A computer readable medium that is non-transitory, the computer readable medium having computer-readable code embodied therein for evaluating an access from a first network node to a second network node, the computer-readable code includes instructions for:

receiving or generating information representative of the access capability; wherein the access capability is associated with a source network node and a destination network node;

generating security metrics associated with the access capability in response to: attack characteristics of a group of network nodes that are capable of attacking the source network node associated with the access capability, attack characteristics of a group of network nodes that are capable of being attacked from the destination network node associated with the access capability, and attack characteristics of the source and the destination nodes associated with the access capability; and evaluating a relative imposed risk associated with a predecessor network node in response to a maximal relative imposed risk associated with each of multiple successor network nodes; wherein the predecessor network node and the multiple successor network nodes are coupled to the first and second network nodes.

48. The computer readable medium of claim 47 wherein the computer-readable code comprises instructions for receiving actual security events and wherein the determining is responsive to the actual security events.

49. The computer readable medium of claim 47 wherein the computer-readable code comprises instructions for receiving actual communication events and wherein the determining is responsive to the actual communication events.

50. The computer readable medium of claim 47 wherein the computer-readable code comprises instructions for evaluating a likelihood of an initiation of an attack at a certain start network node, a probability of accessing a certain target network node from the certain start network node.

51. The computer readable medium of claim 47 wherein the computer-readable code comprises instructions for evaluating risk level associated with the certain target network node.

52. The computer readable medium of claim 47 wherein the computer-readable code comprises instructions for evaluating a probability of passing through multiple intermediate graph nodes positioned between the certain target network node and the certain start network node.

53. The computer readable medium of claim 47 wherein the computer-readable code comprises instructions for evaluating a probability of accessing the successor network node in response to a maximal probability of accessing each of multiple predecessor network nodes.

54. The computer readable medium of claim 47 wherein the computer-readable code comprises instructions for evaluating an imposed risk associated with a certain intermediate node out of multiple intermediate nodes positioned between the certain start network node and the certain target network node in response to an imposed risk associated with the target network node and to probabilities of passing through at least one intermediate node positioned between the target network node and the certain intermediate graph nodes.

55. The computer readable medium of claim 47 wherein the computer-readable code comprises instructions for evaluating a relative imposed risk associated with the predecessor network node in response to a maximal relative imposed risk associated with each of multiple successor network nodes.

56. The computer readable medium of claim 47 wherein the computer-readable code comprises instructions for evaluating an imposed risk associated with a certain intermediate graph node related to all assets of the target network node in response to the sum of the relative imposed risks associated with each of the target network node assets.

57. The computer readable medium of claim 47 wherein the computer-readable code comprises instructions for evaluating an imposed risk level associated with a certain intermediate graph node in response to the probability of accessing the intermediate graph node and the imposed risk associated with the intermediate graph node.

58. The computer readable medium of claim 47 wherein the computer-readable code comprises instructions for receiving information representative of the access capability that comprises information that represents an access through a network node using an ACL rule.

59. The computer readable medium of claim 47 wherein the computer-readable code comprises instructions for determining a metric that represents an imposed risk of attacks which use the access capability.

60. The computer readable medium of claim 47 wherein the computer-readable code comprises instructions for determining a metric that represents the number of attack attempts which use the access capability.

* * * * *